US011200214B2

(12) United States Patent
Cheung et al.

(10) Patent No.: US 11,200,214 B2
(45) Date of Patent: Dec. 14, 2021

(54) CONSTRUCTION AND APPLICATION OF DATA CLEANING TEMPLATES

(71) Applicant: Microsoft Technology Licensing, LLC, Redmond, WA (US)

(72) Inventors: Chiu Ying Cheung, Redmond, WA (US); Taurean Jones, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 197 days.

(21) Appl. No.: 16/442,069

(22) Filed: Jun. 14, 2019

(65) Prior Publication Data

US 2019/0294595 A1  Sep. 26, 2019

Related U.S. Application Data

(63) Continuation of application No. 15/283,170, filed on Sep. 30, 2016, now Pat. No. 10,353,877.

(51) Int. Cl.
*G06F 7/00* (2006.01)
*G06F 16/215* (2019.01)

(52) U.S. Cl.
CPC .................. *G06F 16/215* (2019.01)

(58) Field of Classification Search
CPC .................................................... G06F 16/215
USPC ................................................. 707/600–899
See application file for complete search history.

(56) References Cited

U.S. PATENT DOCUMENTS

| 7,681,185 | B2 | 3/2010 | Kapoor et al. |
| 8,356,045 | B2 | 1/2013 | Chang et al. |
| 9,223,773 | B2 | 12/2015 | Isaacson |
| 2009/0282324 | A1 | 11/2009 | Patel |
| 2009/0307651 | A1 | 12/2009 | Senthil et al. |
| 2013/0311423 | A1* | 11/2013 | Price .................... G06F 16/214 707/609 |
| 2014/0195891 | A1 | 7/2014 | Venkata Radha Krishna Rao et al. |
| 2018/0096004 | A1 | 4/2018 | Cheung et al. |

FOREIGN PATENT DOCUMENTS

CN          105045775 A       11/2015

OTHER PUBLICATIONS

Howard, Chris, "Profiling Microsoft Excel Data with IBM DataWorks", Published on: Jan. 14, 2015 Retrieved From: <<https://developer.ibm.com/bluemix/2015/01/14/profiling-microsoft-excel-data-ibm-dataworks/>>, 7 pages.

(Continued)

*Primary Examiner* — Isaac M Woo
(74) *Attorney, Agent, or Firm* — Medley, Behrens & Lewis, LLC

(57) ABSTRACT

Described herein are various technologies pertaining to construction and application of a data cleaning template. A data cleaning tool, when applying the data cleaning template to a data set, is configured to identify a column in the data set that has data entries of a data type specified in the data cleaning template. In response to identifying the column in the data set, the data cleaning tool, when applying the data cleaning template to the data set, alters a format of the data entries in the column from a first format to a second format, the second format specified in the data cleaning template.

20 Claims, 10 Drawing Sheets

(56) References Cited

OTHER PUBLICATIONS

"Section B—Guideline for Cleansing and Validation of Legacy Data", Published on: Oct. 16, 2003 Retrieved from: <<http://www.health.nsw.gov.au/assets/Documents/apo1031.pdf>>, 16 pages.
Rittman, Mark, "Data Profiling and Automated Cleansing Using Oracle Warehouse Builder 10g Release 2", Published on: Sep. 2006, Retrieved from: <<http://www.oracle.com/technetwork/articles/rittman-owb-090830.html>>, 14 pages.
"Trifacta Wrangler", Published on: Feb. 25, 2016, Retrieved from: <<https://www.trifacta.com/products/wrangler/>>, 5 pages.
Rahm, et al., "Data Cleaning: Problems and Current Approaches", In Journal of IEEE Data Engineering Bulletin, vol. 23, No. 4, Dec. 2000, 11 pages.
Kandel, et al., "Research directions in data wrangling: Visualization and transformations for usable and credible data", In Journal of Information Visualization, vol. 10, No. 4, Oct. 2011, pp. 1-18.
"Non-Final Office Action for U.S. Appl. No. 15/283,170", dated Sep. 6, 2018, 10 pages.
"Response to the Non-Final Office Action for U.S. Appl. No. 15/283,170", filed Feb. 6, 2019, 10 pages.
"Notice of Allowance and Fees Due for U.S. Appl. No. 15/283,170", dated Mar. 1, 2019, 6 pages.

* cited by examiner

| RANK | YEAR | MONTH | RES_POP | DATE |
|------|------|-------|---------|-----------|
| 1 | 2000 | 1 | 85245234 | 1/1/2000 |
| 2 | 2001 | 3 | 72345234 | 3/1/2001 |
| 3 | 2000 | 4 | 67854543 | 4/1/2000 |
| 4 | 2004 | 2 | 66543765 | 2/1/2004 |
| 5 | 2010 | 12 | 64252346 | 12/1/2014 |
| 6 | 2000 | 11 | 52435463 | 11/1/2000 |
| 7 | 2002 | 8 | 51234561 | 8/1/2002 |
| 8 | 2015 | 2 | 43463425 | 2/1/2015 |
| 9 | 2000 | 3 | 42123523 | 3/1/2000 |
| 10 | 2000 | 5 | 32353426 | 5/1/2000 |

DATASETS
DATA SET 1
DATA SET 2
DATA SET 3

FIG. 4

| RANK | YEAR | MONTH | RES_POP | RES_POP |
|---|---|---|---|---|
| 1 | 2000 | JANUARY | 85245234 | JAN 1 2000 |
| 2 | 2001 | MARCH | 72345234 | MAR 1 2001 |
| 3 | 2000 | APRIL | 67854543 | APR 1 2000 |
| 4 | 2004 | FEBRUARY | 66543765 | FEB 1 2004 |
| 5 | | | | |
| 6 | | | | |
| 7 | | | | |
| 8 | | | | |
| 9 | | | | |
| 10 | | | | |

DATA CLEANING TEMPLATE 402

404

MARKETING
FINANCE

SUBMIT   CANCEL

DATASETS
DATA SET 1
DATA SET 2
DATA SET 3

| RANK | YEAR | MONTH | RES_POP | DATE |
|---|---|---|---|---|
| 1 | 2000 | JANUARY | 85245234 | JAN 1 2000 |
| 2 | 2001 | MARCH | 72345234 | MAR 1 2001 |
| 3 | 2000 | APRIL | 67854543 | APR 1 2000 |
| 4 | 2004 | FEBRUARY | 66543765 | FEB 1 2004 |
| 5 | 2010 | DECEMBER | 64252346 | DEC 1 2010 |
| 6 | 2000 | NOVEMBER | 52435463 | NOV 1 2000 |
| 7 | 2002 | AUGUST | 51234561 | AUG 1 2002 |
| 8 | 2015 | FEBRUARY | 43463425 | FEB 1 2015 |
| 9 | 2000 | MARCH | 42123523 | MAR 1 2000 |
| 10 | 2000 | MAY | 32353426 | MAY 1 2000 |

DATASETS
DATA SET 1
DATA SET 2
DATA SET 3

600

CONSTRUCTION AND APPLICATION OF DATA CLEANING TEMPLATES

RELATED APPLICATION

This application is a Continuation of U.S. patent application Ser. No. 15/283,170, filed on Sep. 30, 2016, and entitled "CONSTRUCTION AND APPLICATION OF DATA CLEANING TEMPLATES", the entirety of which is incorporated herein by reference.

BACKGROUND

As computing devices have become ubiquitous, the volume of data produced by such computing devices has continuously increased. Organizations often wish to obtain insights about their processes, products, etc., based upon data generated by numerous data sources, wherein such data from the data sources may have different formats. To allow for these insights to be extracted from data, the data must first be "cleaned", such that a client application (such as an application that is configured to generate visualizations of the data) can consume and generate visualizations based upon the data. In a concrete example, an organization that has many subsidiaries positioned in different countries may want to generate a visualization that compares payroll across the subsidiaries. Some of these subsidiaries, however, may utilize different payroll service applications and, therefore, data output by these payroll service applications may be in different formats and may include different information. Additionally, the different payroll service applications may track compensation using different currencies that correspond to the countries where the subsidiaries operate. Therefore, prior to a client application being able to consume the data and generate the desired visualization, the data from the different payroll service applications must be normalized, validated, enriched, and published in a format that is appropriate for the client application.

Oftentimes, an organization employs an individual, referred to herein as a "data cleaner", to perform tasks of discovering data, normalizing the data, correcting the data (e.g., remove null values), enriching the data, validating the data, and publishing the data for consumption by a client application. Performing these tasks is labor-intensive. Further, utilizing conventional tools, the above-described tasks tend to be performed using a stringent process. Continuing with the example set forth above, two of the subsidiaries may wish to generate visualizations about payroll across the organization. The two subsidiaries, however, may be in different countries and, therefore, may wish to have the data shown in different formats. Utilizing conventional techniques, the data cleaner must manually construct data sets for each of the aforementioned subsidiaries. Moreover, when the underlying data alters, the data cleaner must repeat the tasks described above for each subsidiary that wishes to generate visualizations based upon the underlying data. It can be ascertained that the problem is exacerbated as the number of divisions or subsidiaries of an organization increases, and as the number of different data sets that may be requested by the divisions and/or subsidiaries increases.

SUMMARY

The following is a brief summary of subject matter that is described in greater detail herein. This summary is not intended to be limiting as to the scope of the claims.

Described herein are various technologies pertaining to constructing and employing a data cleaning template, wherein the data cleaning template is well-suited for use by a data cleaner to normalize data for consumption by a client application. When constructing a data cleaning template, the data cleaner can specify a data type, as well as a desired format for data entries (in a data set) that have the specified data type. In a non-limiting example, the data type may be a "date" data type, and the format can be year-month-day. When constructing the data cleaning template, the data cleaner may be provided with a list of selectable data types, and responsive to selecting a data type in the list of selectable data types, a list of selectable formats for the selected data type can be provided. In another exemplary embodiment, the data cleaner can manually describe a format for data entries of the data type. Another exemplary data type can be "currency", and a format of the data type may be "US dollars". Other examples will be readily contemplated by one skilled in the art. The data cleaner, when constructing the data cleaning template, can further specify an access parameter, wherein end users having the access parameter are able to access a formatted data set (wherein the formatted data set is generated based upon the data cleaning template being applied to a data set). For instance, the access parameter may be a particular division in an organization, such that end users belonging to the division in the organization are able to access the formatted data set. In another example, the access parameter may be geographic location, such that end users at the geographic location specified by the data cleaner are able to access the formatted data set.

When the data cleaner wishes to apply the data cleaning template to a data set, the data cleaner can operate a computing device that has a data cleaning tool executing thereon. The data cleaning tool, in response to a command from the data cleaner, imports a data set therein, wherein the data cleaning tool, for example, is configured to facilitate discovering data, normalizing the data, correcting the data (e.g., removing null values), enriching the data, validating the data, and publishing the data. Responsive to the data cleaning tool importing the data set therein, the data cleaner can select an appropriate data cleaning template from amongst a plurality of data cleaning templates constructed by the data cleaner (or some other data cleaner at the organization). The data cleaning tool may then apply the data cleaning template to the data set, resulting in construction of a formatted data set.

When applying the data cleaning template to the data set, the data cleaning tool can search columns in the data set for data entries of the data type specified in the data cleaning template. When the data set includes a column of data entries of the data type specified in the selected data cleaning template, the data cleaning tool can determine whether the data entries have the format specified by the data cleaning template. When the data entries do not have the format specified by the data cleaning template, the data cleaning tool can convert the data entries from the current format to the format specified in the data cleaning template. For example, when the data cleaning template is configured to convert "date" data entries to the format [year-month-day] and the data set imported into the data cleaning tool has "date" data entries of the format [month/day/year], the data cleaning tool, when applying the data cleaning template to the data set, converts the "date" data entries in the column from the [month/day/year] format to the [year-month-day] format.

The data cleaning tool may further assign metadata to the formatted data set (the data set with "date" date entries having the [year-month-day] format), indicating that those with the access parameter defined in the data cleaning template are to have access to the original data set and/or have visibility as to which steps or transformations were performed on the original data set. For instance, a first user may not have permission to have knowledge that data in the formatted data set has undergone a certain transformation, while a second user may be made aware that formats of columns in the formatted data set were subject to change (such that the second user may make further changes if desired). Once the data cleaning tool has applied all data cleaning templates set forth by the data cleaner over the data set loaded into the data cleaning tool, the data cleaning tool can publish the formatted data set, which is then accessible to the end users.

The data cleaning template can be re-utilized over several data sets, even if these data sets are formatted differently. For instance, in a first data set, a first column may have data entries of the "date" data type, while in a second data set, a 10th column may have data entries of the "date" data type. The same data cleaning template can be applied over both data sets with the result being that the columns of data entries in both data sets are formatted to have the "date" data entries formatted in accordance with the format specified in the data cleaning template. This reusability of data cleaning templates over different data sets of different formats is an improvement over conventional macros, which typically require the format of different data sets to be identical if the macro is to be executed over the different data sets.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 illustrates an exemplary graphical user interface.

FIG. 4 illustrates an exemplary graphical user interface that depicts selection of a data cleaning template from amongst a plurality of data cleaning templates.

FIG. 6 illustrates another exemplary graphical user interface that depicts a data set formatted in accordance with a data cleaning template.

DETAILED DESCRIPTION

Figure 1:
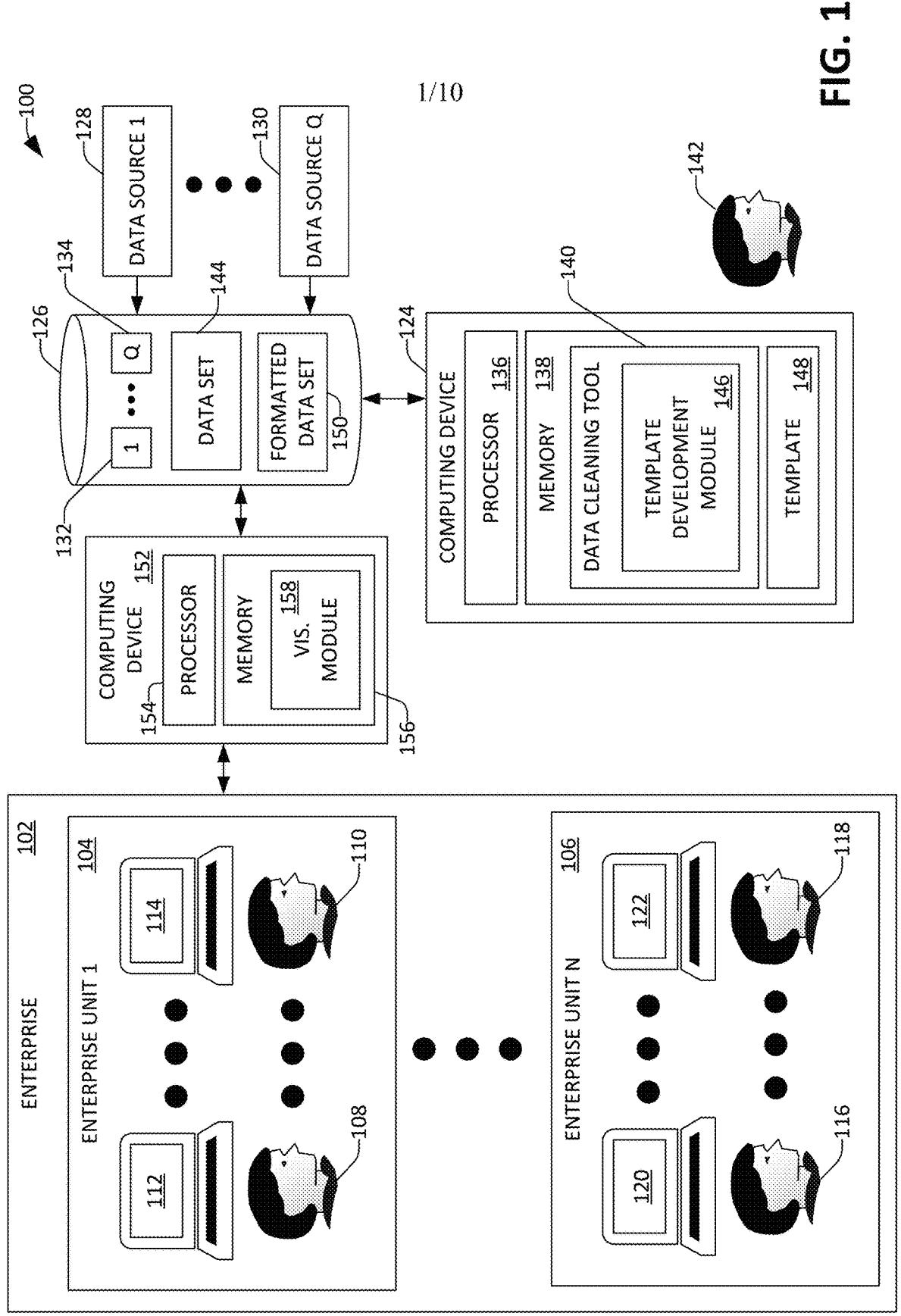
FIG. 1 is a functional block diagram of a computing system that is configured to construct and employ a data cleaning template.

Various technologies pertaining to constructing a data cleaning template and applying the data cleaning template over one or more data sets are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates constructing a data cleaning template and applying the data cleaning template to a data set is illustrated. Generally, a data cleaning template is well-suited for use by a data cleaner, where the data cleaner may be tasked with discovering data from various sources, correcting the data (e.g., removing null values, standardizing strings, etc.), enriching the data (e.g., joining data or performing some sort of complex derivation on the data), validating the data, and publishing the data. When constructing a data cleaning template, the data cleaner can specify a data type, as well as a desired format for data entries of the specified data type. When a data cleaning tool applies the data cleaning template to a data set, the data cleaning tool searches for data entries of the data type in the data set and, when the data cleaning tool identifies data entries of the data type specified in the data cleaning template, formats the data entries in accordance with the format specified in the data cleaning template. A data cleaning template may specify several data types, as well as several formats for the specified data types. The data cleaner may then re-use the data cleaning templates over data sets that have various formats. Data cleaning templates, as will be described herein, are particularly well-suited for use in organizations that have multiple divisions, where different divisions may wish to have certain data types formatted differently (such as "date", floating-point versus integer, currency values, and so forth).

An enterprise 102 can include several enterprise units 104-106. These enterprise units 104-106 may be different divisions, subsidiaries, etc. of the enterprise 102. As shown in FIG. 1, each enterprise unit may include several users who operate computing devices. For example, the first enterprise unit 104 includes users 108-110 that operate computing devices 112-114. Similarly, the nth enterprise unit 106 includes users 116-118 who operate computing devices 120-122. In an example, the users 108-110 in the first enterprise unit 104 may wish to have data entries of a particular data type formatted in accordance with a first format, while the users 116-118 of the nth enterprise unit 106 may wish to have data entries of the particular data type formatted in accordance with an nth format. In a non-limiting example, the users 108-110 in the enterprise unit 104 may wish that data entries that specify dates (e.g., "date" data types) have the format [month/day/year], while the users 116-118 in the nth enterprise unit 106 may wish to have data entries of the "date" data type formatted as [year-month-day].

The system 100 comprises a computing device 124 that is configured to perform various data cleaning operations on data relevant to the enterprise 102. For instance, the system 100 can include a data repository 126 that is accessible to the computing device 124. While shown as being separate from the computing device 124, it is to be understood that the data repository 126 may be included in the computing device 124. The data repository 126 stores data that is relevant to the enterprise 102. For example, the data repository 126 can store data received from a plurality of different data sources 128-130. These data sources 128-130 may include any suitable data sources, such as computer-executable applications, web pages, log files, sensors, etc. Furthermore, data output by the data sources 128-130 can have different formats, including tree structured data, tabular data, unstructured data, semi-structured data, and so forth. The data repository 126 can store data output by the data sources 128-130 as first data 132-qth data 134, respectively.

The computing device 124 includes a processor 136 and memory 138, wherein the memory 138 stores instructions that are executed by the processor 136. The memory 138 has a data cleaning tool 140 loaded therein, wherein the data cleaning tool 141, when executed by the processor 136, is usable by a data cleaner 142 to perform various data cleaning operations on the data 132-134 from the data sources 128-130. For instance, the data cleaning tool 140, when operated by the data cleaner 142, can form a data set 144 in the data repository 126 based upon data included in at least one of the first data 132—the qth data 134. When constructing the data set 144, the data cleaning tool 140 can be employed by the data cleaner 142 to structure data from at least one of the first through qth data 132-134, removing null values in the data, etc. to form a data set 144. The data set 144 can be tabular data, and includes several columns of data entries.

The data cleaning tool 140 includes a template development module 146 that is configured to develop a data cleaning template 148 that can be applied to the data set 144. For instance, the data cleaning tool 140 can receive an indication that the data cleaner 142 wishes to construct a data cleaning template. Responsive to receiving such indication, the template development module 146 can cause a list of data types to be presented on a display that is in communication with the computing device 124. Exemplary data types can include "date", "time", "currency", and so forth, where data of such data types can be displayed in different formats. The template development module 146 can then receive an indication that the data cleaner 102 has selected at least one data type from the selectable list of data types. In response to receiving the selection of the data type, the template development module 146 can present a list of selectable formats for the selected data type. For example, when the data cleaner 142 has selected the "date" data type, selectable formats can include [month/day/year], [month-day-year], [month day year], [year-month-day], etc. In summary, then, the template development module 146 receives one or more data types and corresponding formats for the data types as specified by the data cleaner 142.

In another example, the data cleaner 142 can construct the data cleaning template 148 such that the data cleaning template 148 performs formatting alterations for certain data types across several columns. In an example, the template development module 146 can allow the data cleaner 142 to indicate that entries corresponding to dates (or other data types) across columns are to be combined into a single column, or entries corresponding to dates in a single column are to be split across multiple columns. The template development module 146, responsive to receipt of an indication from the data cleaner 142 that the data cleaning template is to be created, can output the data cleaning template 148. The data cleaning tool 140 may then apply the data cleaning template 148 to a data set selected by the data cleaner 142.

In an example, the data cleaner 142 may choose to apply the data cleaning template 148 over the data set 144 in the data repository 126. To do so, the data cleaning tool 140 is operated by the data cleaner 142, such that the data cleaning tool imports the data set 144. The data cleaning tool 140 may then receive an indication from the data cleaner 142 that the data cleaning template 148 is to be applied to the data set 144 that has been imported into the data cleaning tool 140. The data cleaning tool 140, when applying the data cleaning template 148 to the data set 144, can search the data set 144 and identify columns (or rows) in the data set 144 that include data entries of a type specified in the data cleaning template 148. The data cleaning tool 140 can identify such columns based upon, for instance, metadata assigned to the data set 144 that indicates which columns include data entries of various types. In another example, the data cleaning tool 140 can identify columns that include data entries having the data type by searching columns for data entries formatted in accordance with a format known to be associated with the data type (e.g., data entries in a column having a format of [XX/XX/XXXX] can be inferred to be a data entry having a "date" data type since such format is known to be a format of dates). In yet another example, the data cleaning tool 140 can search a header row in the data set 144 for text that is descriptive of the data type specified in the data cleaning template. For instance, an entry in a header row of the data set 144 that includes the text "date" indicates that a column of data entries beneath the entries has the "date" data type. Further, the data cleaning tool 140 can search across multiple columns to identify data entries in multiple columns that are collectively of the specified data type. For instance, the data set 144 can include a "day" column, a "month" column, and a "year" column, which collectively form a "date" data type.

Responsive to the data cleaning tool 140 identifying columns (or rows) that include data entries of the type specified in the data cleaning template 148, the data cleaning tool 140 can determine whether the format of the data entries in the data set 144 is the format specified in the data cleaning template 148. If the format of the data entries in the data set 144 is the format specified in the data cleaning template 148, the data cleaning tool 140 can leave the data entries unchanged. When, however, the format of the identified data entries is different from the format of the data type specified in the data cleaning template 148, the data cleaning tool 140 can convert the format of the data entries to the format specified in the data cleaning template 148. For example, if the data entries are of the "date" data type and the format of such data entries in the data set 144 is [month/day/year], while the format specified in the data cleaning template 148 is [year-month-day], the data cleaning tool 140, when applying the data cleaning template 148 to the data set 144, can alter the format of the data entries in the data set 144 to the data format specified in the data cleaning template 148. In another example, when the data set 144 includes a "day", "month", and "year" columns, and the data cleaning template 148 is designed to combine data entries therein into a single column (e.g., a "date" column), the data cleaning tool 140 can transform the entries [1], [5], [2000] across 3 columns (for instance) into [Jan. 5, 2000] (or some other suitable format specified in the data cleaning template 148). The data cleaning tool 140, responsive to applying the data cleaning template 148 to the data set 144, can export a formatted data set 150 for retention in the data repository 126. The formatted data set 150 includes column(s) and/or row(s) that corresponds to the column(s) and/or row(s) in the data set 144 that has the data entries of the type specified in the data cleaning template 148. Further, in the formatted data set 150, the column(s) and/or row(s) has data entries of the format specified in the data cleaning template 148 used by the data cleaning tool 140 to create the formatted data set 150.

The data cleaning template 148 can be applied by the data cleaning tool 140 as the data set 144 is updated. Further, the data cleaning tool 140 can apply the data cleaning template to an entirely new data set. Therefore, the data cleaning tool 140 can re-use the data cleaning template 148 on an updated version of the data set 144 or an entirely different data set which may have a format that is distinct from the format of the data set 144. The data cleaner 142 can further specify that transformations performed on the data set 144 to create the formatted data set 150 are to be made available to users that have some access parameter defined by the data cleaner 142 (and, optionally, included in the data cleaning template 148). In an example, the formatted data set 150 may be created for the users 108-110 in the first enterprise unit 104, where the user 108 is able to review transformations performed on the data set 144 to create the formatted data set 150, while the user 110 does not have permission to review such transformations. The cleaner 142 can assign an access parameter to the formatted data set 150 by way of the data cleaning tool 140, wherein the access parameter indicates that transformations to the data set 144 used to create the formatted data set 150 are available to users of computing devices that have such access parameter.

In this example, the access parameter can be an identity of the first enterprise unit 104. Since the users 108-110 are included in the first enterprise unit 104, such users 108-110, by way of the computing devices 112-114, have permission to view the above-described transformations. Contrarily, users 116-118 of the nth enterprise unit 106 may be unable to access the transformations since they belong to the nth enterprise unit 106 rather than the first enterprise unit 104.

Thus, in this example, the data cleaning template 148 may correspond to the first enterprise unit 104 and can be used to generate data sets that are to be viewed by users 108-110 in the first enterprise unit 104.

The system 100 can further include another computing device 152 that includes a processor 154 and memory 156 that stores instructions that are executed by the processor 154. The memory 156 can have a visualization module 158 loaded therein, wherein the visualization module 158 is configured to generate visualizations of data sets. The computing device 152 is accessible to the computing devices 112-114 by way of a network connection (e.g., an intranet of the enterprise 102). The computing device 152 can also access the data repository 126. In an example, the computing device 112 can be operated by the user 108 to access the computing device 152, and the computing device 112 can transmit a request to the computing device 152 to execute the visualization module 158. The user 108 can indicate that, for instance, the visualization module 158 is to generate a visualization of the data set 144. The visualization module 158, responsive to receiving the request for the visualization, can ascertain that the formatted data set 150 has been constructed for users in the first enterprise unit 104 of the enterprise 102. Accordingly, the visualization module 158 can generate a visualization based upon the formatted data set 150 and cause the visualization to be presented on the display of the computing device 112. Such visualization may be a chart, a table, a graph, or any other suitable visualization. In another example, the user 108 can cause the computing device 112 to access the formatted data set 150 by way of the visualization module 158. In other words, the user 108 can operate the computing device 112 to cause the visualization module 158 to generate a visualization of the formatted data set 150 by requesting such visualization of the formatted data set 150 (rather than the data set 144).

While the data cleaning template 148 described above has been described as being constructed to cause data entries of a certain data type to be formatted in accordance with a data format specified in the data cleaning template 148, other configurations are also contemplated. For instance, the data cleaning template 148 can be constructed to specify a data type and to include an indication that columns that include data entries of the data type are to be removed. In a non-limiting example, the data type specified in the data cleaning template 148 may be "personal identifying information", such as social security numbers, names, etc. Moreover, the data cleaning template 148 can include an indication that columns in data sets to which the data cleaning template 148 is to be applied that include data entries of the "personal identifying information" type are to be removed from such data sets. Further, the data cleaning template 148 can include an indication that rows in the data sets to which the data cleaning template 148 is to be applied are to be searched for missing data entries, and that rows with missing data entries are to be deleted from the data sets. In yet another example, the data cleaning template 148 can include an indication that columns in data sets that comprise data entries of the type "personal identifying information" are to be processed such that the data entries are masked.

Data cleaning templates have various advantages over conventional approaches for cleaning data. These advantages include the ability to reuse a data cleaning template for different versions of a data set or different data sets entirely. Further, data cleaning templates can be constructed relatively quickly, thereby allowing for different formatted data sets to be generated for different end users. For instance, different data cleaning templates can be used to generate a first formatted data set that is formatted for users of the first enterprise unit 104, and a second formatted data set that is formatted for users in the nth enterprise unit 106.

Figure 2:
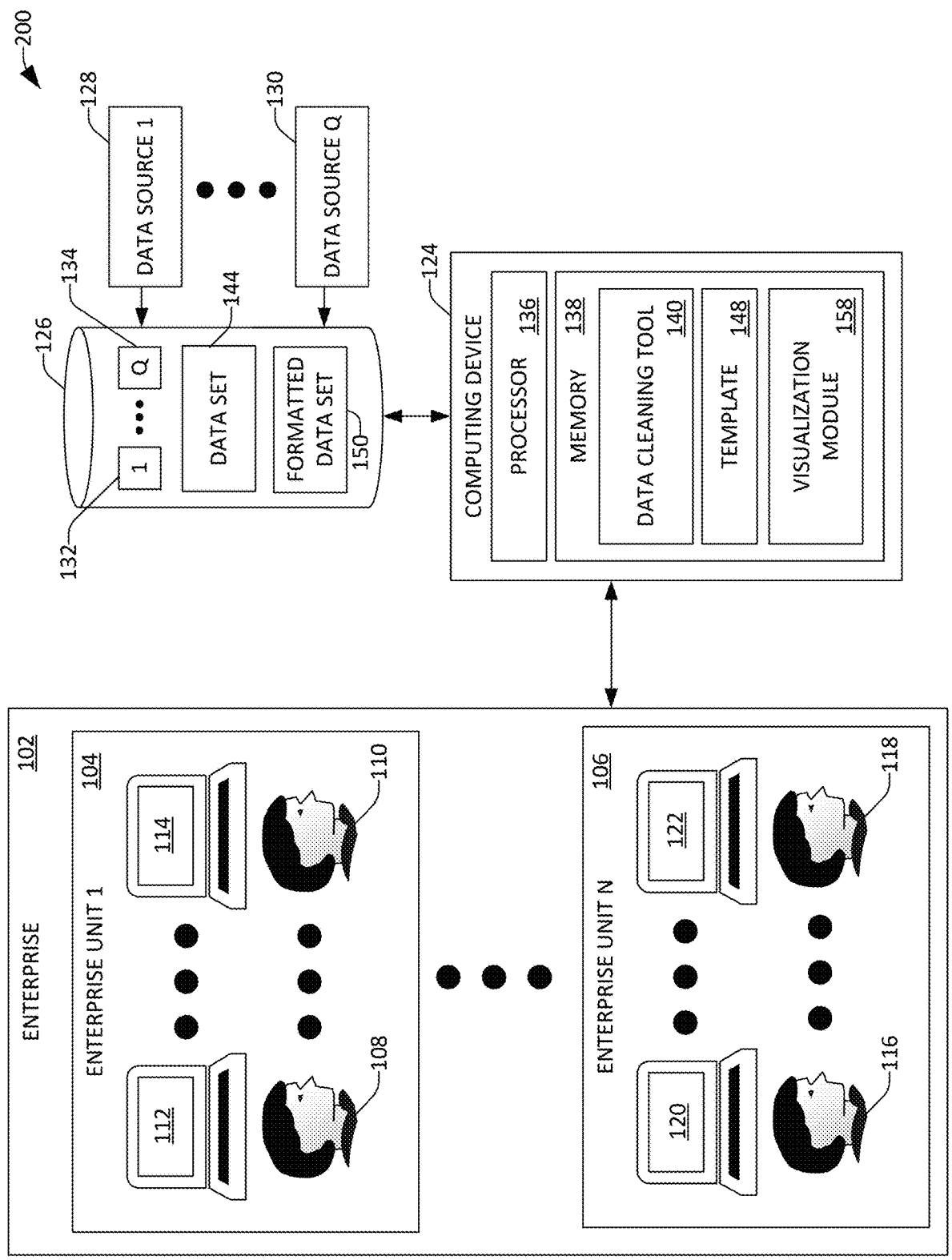
FIG. 2 is a functional block diagram of a computing system that facilitates application of a data cleaning template over a data set responsive to receipt of a request from a client computing device for at least a portion of the data set.

Now referring to FIG. 2, another exemplary computing system 200 that is configured to construct a data cleaning template and apply the data cleaning template over a data set is illustrated. The system 200 is illustrated as the computing device 124 including both the data cleaning tool 140 and the visualization module 158, although other architectures are contemplated. In the exemplary system 200, the data cleaning tool 140 applies the data cleaning template 148 to the data set 144 in response to a user requesting a visualization of the data set 144—thereby allowing for the formatted data set 150 to represent a most recent version of data from the data sources 128-130. In an example, the computing device 112 can be operated by the user 108 to transmit a request for at least a portion of the data set 144 (e.g., a visualization of at least a portion of the data set) to the visualization module 158. The visualization module, in response to receiving the request, can provide an identity of the data set 144 and information pertaining to the user 108 to the data cleaning tool 140. The data cleaning tool 140 imports the data set 144, and identifies an appropriate data cleaning template to apply to the data set 144 based upon the information pertaining to the user 108 (e.g., such as the enterprise unit to which the user belongs, geographic location of the user, etc.). In this example, the data cleaning tool 140 can determine that the data cleaning template 148 corresponds to the user.

The data cleaning tool 140 applies the data cleaning template 148 to the data set 144, resulting in creation of the formatted data set 150. The data cleaning tool 140 transmits an indication to the visualization module 158 that the formatted data set 150 has been created, and the visualization module 158 transmits at least a portion of the formatted data set 150 to the computing device 112 (where the portion of the formatted data set 150 corresponds to the portion of the data set 144 requested by way of the computing device 112). Thus, from the foregoing, it can be ascertained that the data cleaning tool 140 can apply the data cleaning template 148 to the data set 144 in response to a request for at least a portion of the data set 144. In another example, the data cleaning tool 140 can automatically apply the data cleaning template 148 to the data set 144 each time that the data set 144 is updated.

Now referring to FIG. 3, an exemplary graphical user interface 300 that depicts a data set is illustrated. For instance, the graphical user interface 300 may be a graphical user interface corresponding to the data cleaning tool 140. The cleaner 142 can load a data set (e.g., data set 1) into the data cleaning tool 140 and such data set can be presented on a display. In the exemplary data set shown in the graphical user interface 300, the data set includes a column (column 3) of data entries of a type "month" and another column (column 5) of data entries of a type "date". In the "month" column, the month is represented numerically, while in the "date" column, the date is represented in the format [month/day/year].

Turning now to FIG. 4, another exemplary graphical user interface 400 corresponding to the data cleaning tool 140 is illustrated. Responsive to importing the data set into the data cleaning tool 140, the cleaner 142 can indicate to the data cleaning tool 140 that a data cleaning template is to be applied to the data set. A window 402 can be presented, wherein the window includes a pulldown menu 404. The data cleaning tool 140 can receive an indication that the data cleaner 142 has selected the pulldown menu 404, and the data cleaning tool 140 can cause a list of selectable data cleaning templates to be presented. In this example, the list includes a data cleaning template named "Marketing" and a data cleaning template named "Finance". These data cleaning templates can respectively correspond to a marketing unit in an enterprise and a finance unit in the enterprise.

Figure 5:
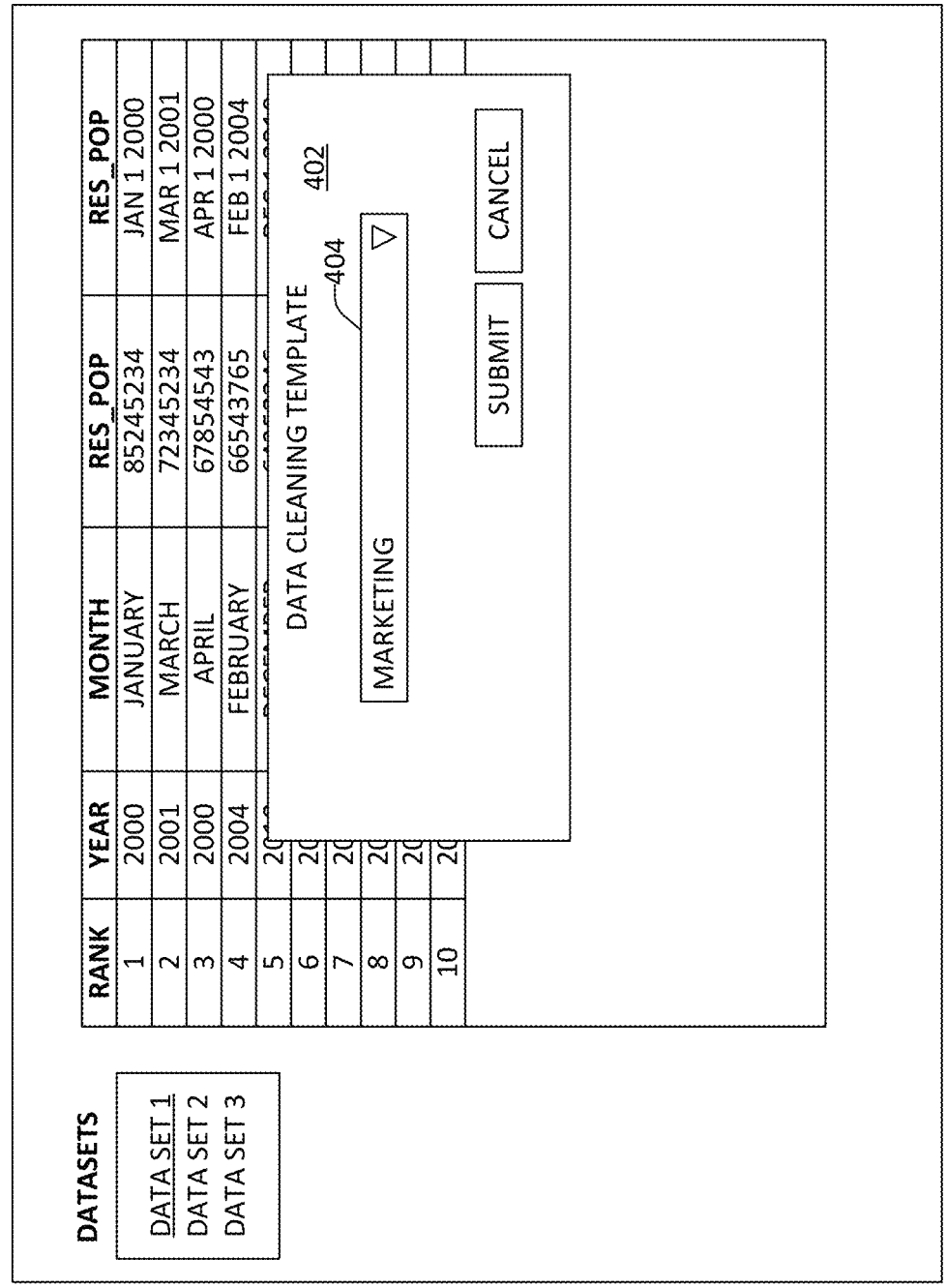
FIG. 5 illustrates an exemplary graphical user interface that depicts a data cleaning template being selected.

Now referring to FIG. 5, an exemplary graphical user interface 500 is illustrated, wherein the data cleaner 142 has selected the "Marketing" data cleaning template from the selectable list of data cleaning templates.

Turning to FIG. 6, yet another exemplary graphical user interface 600 is illustrated, where the graphical user interface 600 depicts a formatted data set. The data cleaning tool 140 has created the formatted data set by applying the "Marketing" data cleaning template to the data set depicted in the graphical user interface 300 shown in FIG. 3. In the example illustrated in FIG. 6, the "Marketing" data cleaning template specifies that data entries of the "month" data type are to be formatted as names of months, while data entries of the "date" data type are to be formatted as an abbreviation of the month name, followed by a day, followed by a year. Therefore, for instance, a data entry in the "month" column will be transformed from "1" to "January", while a data entry in the "date" column will be transformed from [Jan. 1, 2000] to [Jan. 1, 2000]. The data cleaner 142 may then make the formatted data set depicted in FIG. 6. available to users in the marketing unit of an enterprise, and such users can employ the data set to generate visualizations.

Figure 7:
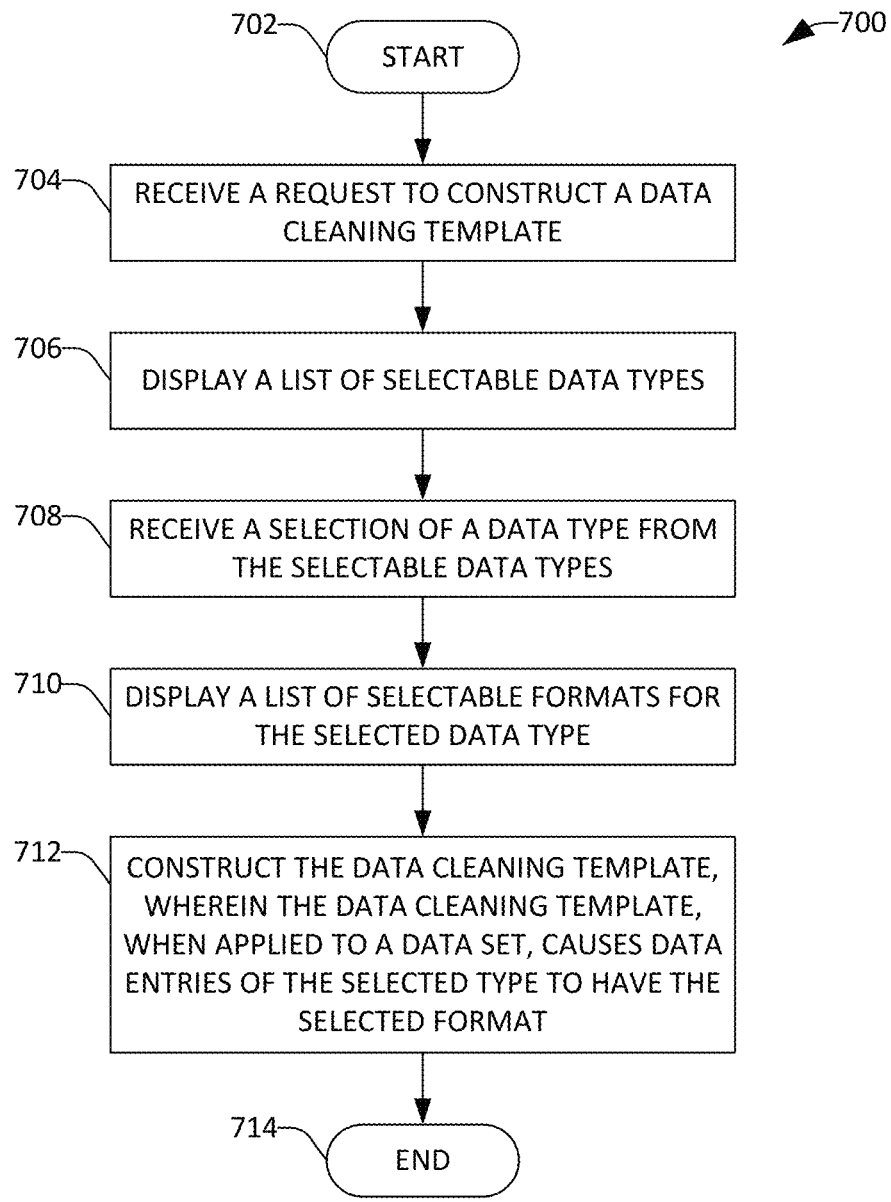
FIG. 7 is a flow diagram that illustrates an exemplary methodology for constructing a data cleaning template.
Figure 8:
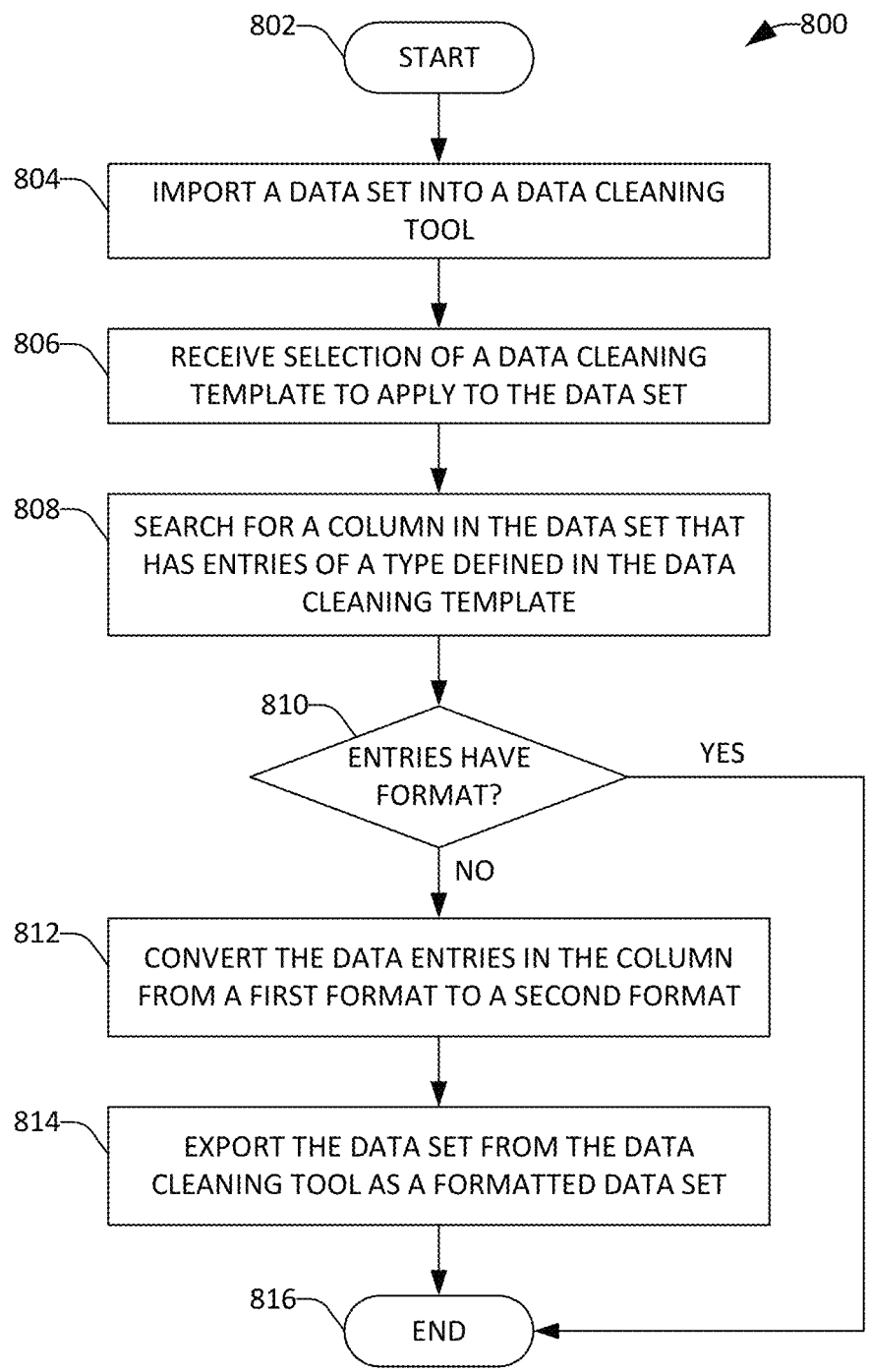
FIG. 8 is a flow diagram that illustrates an exemplary methodology for creating a formatted data set through use of a data cleaning template.
Figure 9:
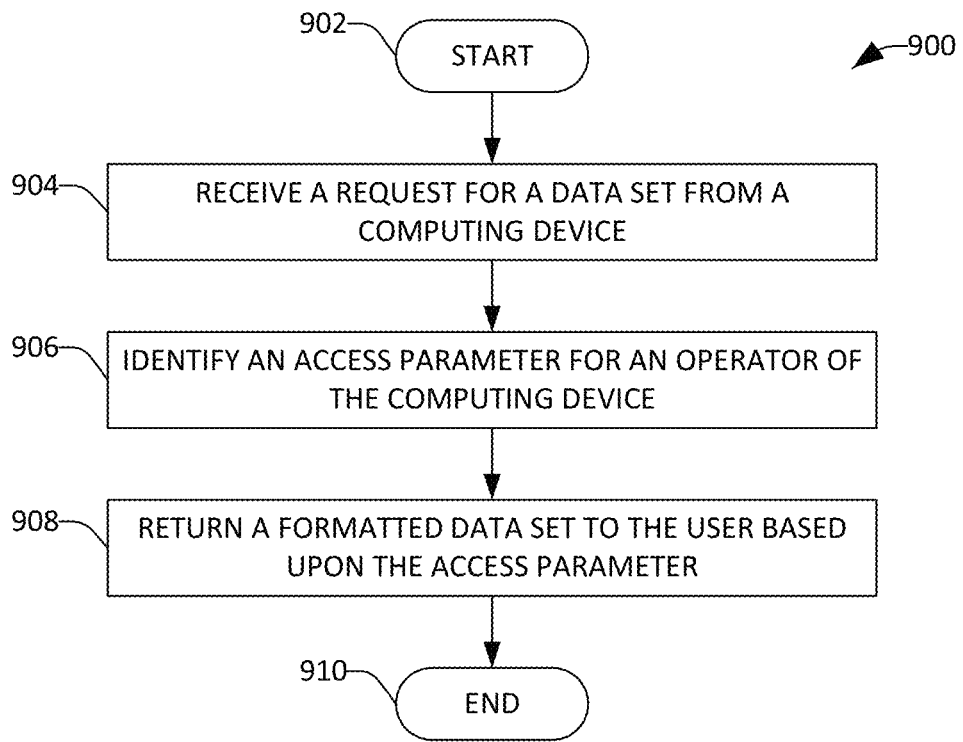
FIG. 9 is a flow diagram illustrating an exemplary methodology for transmitting at least a portion of a formatted data set to a computing device.

FIGS. 7-9 illustrate exemplary methodologies relating to construction and use of a data cleaning template. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 7, an exemplary methodology 700 for constructing a data cleaning template is illustrated. The methodology 700 starts at 702, and at 704, a request to construct a data cleaning template is received at a computing device. At 706, responsive to receiving the request to construct the data cleaning template, a list of selectable data types is displayed. Alternatively, data types can be subject to a search such that the data cleaner 142 can search for a particular data type.

At 708, a selection of a data type is received from the selectable data types. In the example shown above, the data type may be "date" data type. At 710, responsive to receiving the selection of the data type, a list of selectable formats for the selected data type can be presented. Continuing with the example set forth above, a list of date formats can be displayed to the data cleaner 142. In an alternative embodiment, the data cleaner 142 can manually specify a desired format of data entries of the selected data type. At 712, responsive to the data cleaner selecting the format for the data type, the data cleaning template is constructed, wherein the data cleaning template when applied to a data set by the data cleaning tool 140 causes data entries of the selected type to have the specified format. The data cleaner 142 can save the data cleaning template in a library of data cleaning templates for subsequent selection and re-use. The methodology 700 completes at 714.

Now referring to FIG. 8, an exemplary methodology 800 for applying a data cleaning template to a data set is illustrated. The methodology 800 starts at 802, and at 804, a data set is imported into the data cleaning tool 140. At 806, a selection of the data cleaning template that is to be applied to the data set is received. Responsive to the data cleaning template being selected, the data cleaning tool 140 applies the selected data cleaning template to the data set imported into the data cleaning tool. More specifically, at 808, a column(s) in the data set is searched for, wherein such column(s) has entries of a data type defined in the data cleaning template. At 810, when the column(s) in the data set is identified, a determination is made as to whether the entries of the type defined in the data cleaning template have a format specified in the data cleaning template. If the format of the data entries in the column(s) is different from the format specified in the data cleaning template, then at 812, data entries in the column(s) are converted from a first format (the format of the entries in the imported data set) to a second format (the format specified in the data cleaning template). At 814, the data set is exported from the data cleaning tool as a formatted data set, and the data cleaner 142 can make the formatted data set available to appropriate users. The methodology 800 completes at 816.

Turning now to FIG. 9, an exemplary methodology 900 that facilitates visualizing a formatted data set is illustrated. The methodology 900 starts at 902, and at 904, a request for a data set is received from a computing device in an enterprise. At 906, an access parameter for an operator of the computing device is identified. As indicated previously, this access parameter can be a unit in the enterprise in which the operator of the computing device works, a geographic location of the operator of the computing device, or the like. At 908, a formatted data set is returned to the user based upon the access parameter. The methodology 900 completes at 910.

Various examples are now set forth.

Example 1

A method comprising: at a data cleaning tool executed by at least one processor: importing a data set into the data cleaning tool, the data set has a plurality of columns of data entries, wherein a column in the data set includes a plurality of data entries of a data type that are formatted in a first format; applying a data cleaning template to the data set, wherein the data cleaning template identifies the data type and a second format for the data entries of the data type, wherein applying the data cleaning template to the data set comprises: identifying the column in the data set that has the data entries of the data type identified in the data cleaning template; determining that the data entries in the column of the data set are of a format that is different from the second format identified in the data cleaning template; responsive to determining that the data entries in the column of the data set are of a format that is different from the second format identified in the data cleaning template, creating a formatted data set by altering the format of the plurality of entries from the first format to the second format, wherein the second format is different from the first format; and exporting the formatted data set.

Example 2

A method according to Example 1, wherein the data cleaning tool exports the formatted data set with an access parameter, the access parameter defines who is authorized to view transformations performed on the data set to create the formatted data set, and further wherein the access parameter is a division in multiple divisions of an enterprise, the method further comprising: receiving a request for the data set from a computing device, the request comprises an indication that a user of the computing device belongs to the division in the enterprise; and responsive to receiving the request for the data set, transmitting an identity of at least one transformation in the transformations to the computing device.

Example 3

A method according to Example 1, wherein the data cleaning tool exports the formatted data set with an access parameter, the access parameter defines who is authorized to view transformations performed on the data set to create the formatted data set, and further wherein the access parameter is a geographic location, the method further comprising: receiving a request for the data set from a computing device, the request comprises an indication that the computing device is at the geographic location; and responsive to receiving the request for the data set, an identity of at least one transformation in the transformations to the computing device.

Example 4

A method according to any of Examples 1-3, wherein the first format is a first date format, and the second format is a second date format.

Example 5

A method according to any of Examples 1-3, wherein the first format is floating point, and the second format is integer.

Example 6

A method according to any of Examples 1-5, further comprising: creating the data cleaning template, wherein creating the data cleaning template comprises: receiving a selection of the data type from a plurality of possible data types; receiving a selection of a format of the data type from amongst a plurality of possible formats of the data type; and creating the data cleaning template based upon selected data type and the selected format.

Example 7

A method according to any of Examples 1-6, further comprising: importing a second data set into the data cleaning tool, the second data set has a second plurality of columns of data entries, wherein a column in the second data set includes data entries of the data type specified in the data cleaning template, the data entries in the column in the second data set have a third format, and further wherein the data set is received from a first data source and the second data set is received from a second data source that is different from the first data source; and applying the data cleaning template to the second data set, wherein applying the data cleaning template to the second data set comprises: identifying the column in the second data set that includes the second plurality of data entries of the data type specified in the data cleaning template; responsive to identifying the column in the second data set, determining that the data entries in the column in the second data set have a format that is different from the second format specified in the data cleaning template; responsive to determining that the data entries in the column in the second data set have a format that is different from the first format, creating a second formatted data set by altering the format of the plurality of entries in the column of the second data set from the third format to the second format, wherein the third format is different from the second format and the third format; and exporting the second formatted data.

Example 8

A method according to any of Examples 1-7, further comprising: subsequent to importing the data set into the data cleaning tool and prior to applying the data cleaning template to the data set, at the data cleaning tool: responsive to receiving a request to apply one or more data cleaning templates to the data set, presenting a list of available data cleaning templates; and applying the data cleaning template to the data set responsive to receiving a selection of the data cleaning template from the list of available data cleaning templates.

Example 9

A method according to any of examples 1-8, wherein the acts of importing the data set into the data cleaning tool and applying the data cleaning template to the data set are performed in response to receiving a request for the data set from a client computing device.

Example 10

A computing system comprising: at least one processor that is programmed with computer-executable instructions, wherein the at least one processor, when executing the computer-executable instructions, is configured to: apply a data cleaning template to a data set in response to receipt of a request to apply the data cleaning template to the data set, wherein the at least one processor, when applying the data cleaning template to the data set, is configured to: search across columns in the data set for a column that has data entries of a type specified in the data cleaning template; when the data set includes the column that has the data entries of the type specified in the data cleaning template, determine whether the data entries of the type have a format specified in the data cleaning template; and when the data set includes the column that has the data entries of the type specified in the data cleaning template and when the data entries of the type fail to have the format specified in the data cleaning template, create a formatted data set, wherein the formatted data set includes a second column that corresponds to the column in the data set, and wherein the second column includes formatted data entries of the type, the formatted data entries of the type correspond to the data entries of the type in the data set, and further wherein the formatted data entries of the type have the format specified in the data cleaning template.

Example 11

A computing system according to Example 10, wherein the processor, when creating the formatted data set, is configured to convert the data entries of the type from a first format to the formatted data entries of the type that have the format specified in the data cleaning template.

Example 12

A computing system according to any of Examples 10-11, wherein the type is a date type.

Example 13

A computing system according to any of Examples 10-12, wherein the at least one processor, when applying the data cleaning template to the data set, is further configured to: assign metadata to the formatted data set, the metadata identifies an access parameter specified in the data cleaning template, the access parameter indicating that users of computing devices that have the access parameter are authorized to view transformations performed on the data set to create the formatted data set.

Example 14

A computing system according to Example 13, the access parameter being one of a geographic location or an identity of a division in an enterprise.

Example 15

A computing system according to Example 13, wherein the at least one processor, when executing the computer-executable instructions, is further configured to: responsive to receiving a request for the data set from a computing device operated by a user who has the access parameter, transmit at least a portion of the formatted data set to the computing device and an identity of a transformation in the transformations.

Example 16

A computing system according to any of Examples 10-15, wherein the at least one processor, when executing the computer-executable instructions, is further configured to: prior to applying the data cleaning template to the data set, receive a selection of the data cleaning template from amongst a plurality of data cleaning templates; and apply the data cleaning template responsive to receiving the selection of the data cleaning template from amongst the plurality of data cleaning templates.

Example 17

A computing system according to any of Examples 10-16, wherein the at least one processor, when executing the computer-executable instructions, is further configured to: apply the data cleaning template to a second data set, wherein the data set is received from a first data source and the second data set is received from a second data source, and wherein the data set and the second data set have different formats.

Example 18

A computing system according to any of Examples 10-17, wherein the at least one processor, when executing the computer-executable instructions, is further configured to: construct a visualization in response to receipt of a request for a visualization of at least a portion of the data set from a computing device, wherein the at least one processor constructs the visualization based upon the formatted data set.

Example 19

A computing system according to any of Examples 10-18, wherein the at least one processor, when executing the computer-executable instructions, is further configured to: apply a second data cleaning template over the formatted data set, wherein the at least one processor, when applying the second data cleaning template to the formatted data set, is configured to search for columns in the formatted data set that have second data entries of a second type and convert a format of the second data entries to a second format specified in the second data cleaning template.

Example 20

A computer-readable storage medium comprising instructions that, when executed by at least one processor, cause the at least one processor to perform acts comprising: importing a data set into a data cleaning tool; receiving a selection of a data cleaning template from amongst a plurality of selectable data cleaning templates; responsive to receiving the selection of the data cleaning template from amongst the plurality of data cleaning templates, applying the data cleaning template to the data set, wherein applying the data cleaning template to the data set comprises: identifying a column in the data set that has data entries of a type specified in the data cleaning template, wherein the data entries have a first format; responsive to identifying the column in the data set, converting the data entries of the type to second data entries of the type, wherein the second data entries have a second format specified in the data cleaning template, the second format being different from the first format; and responsive to converting the data entries of the type to second data entries of the type, exporting the data set as a formatted data set.

Example 21

A computing system comprising: means for applying a data cleaning template to a data set in response to receipt of a request to apply the data cleaning template to the data set, wherein the means for applying the data cleaning template to the data set comprises means for searching across columns in the data set for a column that has data entries of a type specified in the data cleaning template; means for determining whether the data entries of the type have a format specified in the data cleaning template; and means for creating a formatted data set, wherein the formatted data set includes a second column that corresponds to the column in the data set, and wherein the second column includes formatted data entries of the type, the formatted data entries of the type correspond to the data entries of the type in the data set, and further wherein the formatted data entries of the type have the format specified in the data cleaning template.

Figure 10:
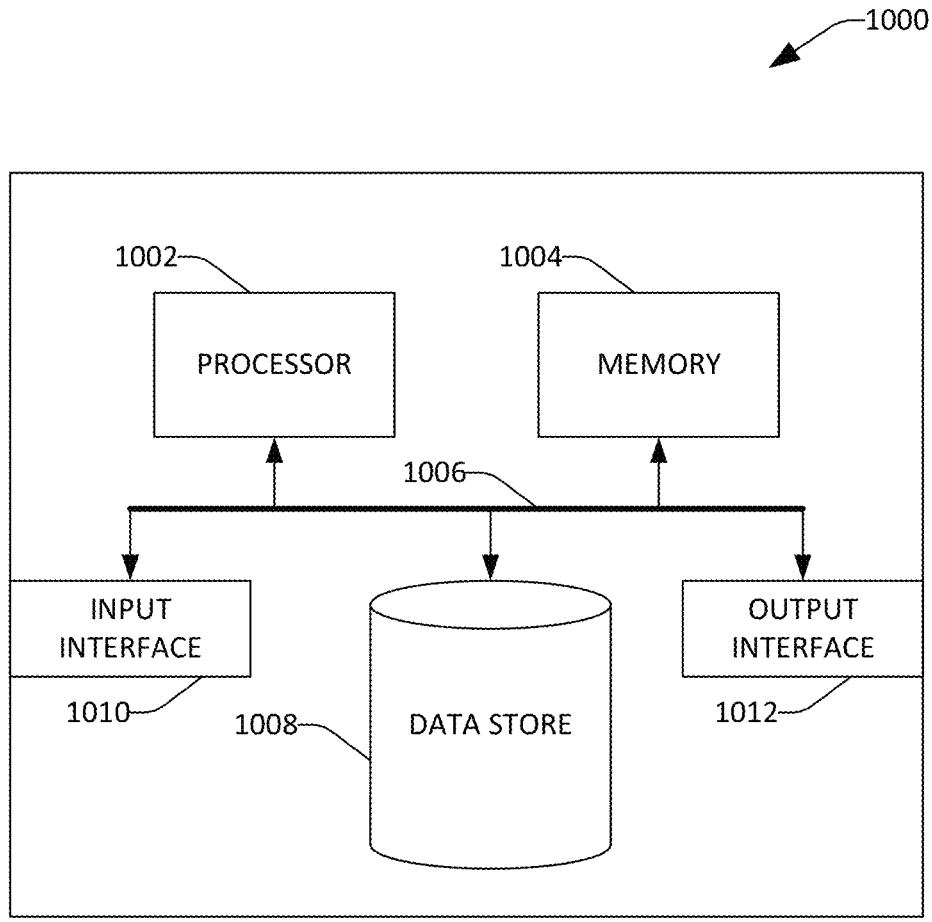
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that supports construction of a data cleaning template. By way of another example, the computing device 1000 can be used in a system that applies a data cleaning template to a data set. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store data cleaning templates, data types, formats, etc.

The computing device 1000 additionally includes a data store 1008 that is accessible by the processor 1002 by way of the system bus 1006. The data store 1008 may include executable instructions, data cleaning templates, data sets, data output by data sources, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory that stores instructions that, when executed by the processor, cause the processor to perform acts comprising:
      receiving a request to construct a data cleaning template;
      based upon the request to construct the data cleaning template, causing a list of selectable data types to be displayed on a display of a client device in communication with the computing system;
      receiving, from the client device, a selection of a data type from amongst the list of selectable data types;
      based upon the selection of the data type, causing a list of selectable data formats for the data type to be displayed on the display of the client device;
      receiving, from the client device, a selection of a data format from amongst the list of selectable data formats;
      receiving, from the client device, a selection of a second data type and a selection of a second data format for the second data type; and
      constructing the data cleaning template based upon the selection of the data type, the selection of the data format, the selection of the second data type, and the selection of the second data format, wherein the data cleaning template, when applied to data sets, identifies entries in the data set of the data type and second entries of the second data type, wherein the entries have a third data format that is different from the data format and the second entries have a fourth data format that is different from the second data format, and further wherein the data cleaning template;
      converts the entries of the data type to have the data format in response to identifying that the entries in the data sets have the third data format; and
      converts the second entries of the second data type to have the second data format in response to identifying that the second entries in the data sets have the fourth data format.

2. The computing system of claim 1, the acts further comprising:
   subsequent to constructing the data cleaning template, assigning an access parameter to the data cleaning template, wherein the access parameter identifies at least one end user who is able to access a formatted data set, wherein the formatted data set is generated responsive to the data cleaning template being applied to a data set.

3. The computing system of claim 1, the acts further comprising:
   applying the data cleaning template to a data set, wherein applying the data cleaning template to the data set comprises:
      identifying each entry in the data set that has the data type; and
      converting each identified entry that has the third data format to a respective entry with the data format.

4. The computing system of claim 1, the acts further comprising applying the data cleaning template to a data set, wherein applying the data cleaning template to the data set comprises:
   receiving a selection of a column in the data set; and
   applying the data cleaning template only to entries in the selected column.

5. The computing system of claim 1, wherein the data type is selected from a group consisting of a date data type, a time data type, and a currency data type.

6. The computing system of claim 1, the acts further comprising:
   prior to causing the list of selectable data types to be displayed on the display of the client device, identifying a plurality of data types of entries in a data set to which the data cleaning template is to be applied, wherein the list of selectable data types comprises the plurality of identified data types.

7. The computing system of claim 1, the acts further comprising:
   subsequent to constructing the data cleaning template, storing the data cleaning template in a library of data cleaning templates, wherein the library of data cleaning templates is accessible to the client device for subsequent application of the data cleaning template to other data sets.

8. A computing system comprising:
   a processor; and
   memory that stores instructions that, when executed by the processor, cause the processor to perform acts comprising:
      receiving a request to construct a data cleaning template;
      based upon the request to construct the data cleaning template, causing a list of selectable data types to be displayed on a display of a client device that is in communication with the computing system;

receiving from the client device a selection of a data type from amongst the list of selectable data types and a data format for the data type, wherein the data format for the data type is based on manual input by an end user of the client device;

receiving from the client device a selection of a second data type from amongst the list of selectable types and a second data format for the second data type; and constructing the data cleaning template based upon the selection of the data type, the data format for the data type, the selection of the second data type, and the second data format for the second data type, wherein the data cleaning template, when applied to a data set;

identifies an entry in the data set of the data type, wherein the entry has a third data format that is different from the data format, and further wherein the data cleaning template converts the entry of the data type to have the data format in response to identifying that the entry in the data set has the third data format; and identifies a second entry in the data set of the second data type, wherein the second data entry has a fourth data format that is different from the second data format, and further wherein the data cleaning template converts the second entry of the second data type to have the second format in response to identifying that the second entry in the data set has the fourth data format.

9. The computing system of claim 8, the acts further comprising:

assigning an access parameter to the data cleaning template, wherein the access parameter defines a list of end users who are able to access a formatted data set, wherein the formatted data set is generated responsive to the data cleaning template being applied to the data set.

10. The computing system of claim 8, the acts further comprising:

applying the data cleaning template to the data set, wherein applying the data cleaning template to the data set comprises:

identifying each entry in the data set that has the data type; and converting each identified entry that has the third data format to a respective entry with the data format.

11. The computing system of claim 8, the acts further comprising applying the data cleaning template to the data set, wherein applying the data cleaning template to the data set comprises:

receiving a selection of a column in the data set; and
applying the data cleaning template only to entries in the selected column.

12. The computing system of claim 8, wherein the data type is selected from a group consisting of a date data type, a time data type, and a currency data type.

13. The computing system of claim 8, the acts further comprising:

prior to causing the list of selectable data types to be displayed on the display of the client device, identifying a plurality of data types of entries in the data set, wherein the list of selectable data types comprises the plurality of identified data types.

14. The computing system of claim 8, the acts further comprising:

subsequent to constructing the data cleaning template, storing the data cleaning template in a library of data cleaning templates, wherein the library of data cleaning templates is accessible to the client device for subsequent application of the data cleaning template to other data sets.

15. A method comprising:

receiving a request to construct a data cleaning template;
based upon the request to construct the data cleaning template, causing a list of selectable data types to be displayed on a display of a client device in communication with the computing system;

receiving, from the client device, a selection of a data type from amongst the list of selectable data types;

based upon the selection of the data type, causing a list of selectable data formats for the data type to be displayed on the display of the client device;

receiving, from the client device, a selection of a data format from amongst the list of selectable data formats;

receiving, from the client device, a selection of a second data type and a selection of a second data format for the second data type; and constructing the data cleaning template based upon the selection of the data type; the selection of the data format, the selection of the second data type, and the selection of the second data format, wherein the data cleaning template, when applied to a data set;

identifies an entry in the data set of the data type, wherein the entry has a third data format that is different from the data format, and further wherein the data cleaning template converts the entry of the data type to have the data format in response to identifying that the entry in the data set has the third data format; and identifies a second entry in the data set of the second data type, wherein the second entry has a fourth data format that is different from the second data format, and further wherein the data cleaning template converts the second entry of the second data type to have the second data format in response to identifying that the second entry in the data set has the fourth data format.

16. The method of claim 15, further comprising:
assigning an access parameter to the data cleaning template, wherein the access parameter defines a list of end users who are able to access a formatted data set generated based on application of the data cleaning template to the data set.

17. The method of claim 15, further comprising:
applying the data cleaning template to the data set, wherein applying the data cleaning template to the data set comprises:

identifying each entry in the data set that has the data type; and converting each identified entry that has the third data format to a respective entry with the data format.

18. The method of claim 15, further comprising:
applying the data cleaning template to the data set, wherein applying the data cleaning template to the data set comprises:

identifying each entry in the data set that has the second data type; and converting each identified entry that has the fourth data format to a respective entry with the second data format.

19. The method of claim 15, further comprising:
applying the data cleaning template to the data set,
wherein applying the data cleaning template to the data set comprises:
receiving a selection of a column in the data set; and
applying the data cleaning template only to entries in the selected column.

20. The method of claim 15, further comprising:
subsequent to constructing the data cleaning template, storing the data cleaning template in a library of data cleaning templates, wherein the library of data cleaning templates is accessible to the client device for subsequent application of the data cleaning template to other data sets.

* * * * *